(12) United States Patent
Kuroda et al.

(10) Patent No.: US 8,589,989 B2
(45) Date of Patent: Nov. 19, 2013

(54) IN-TRAIN INFORMATION DISTRIBUTION AND DISPLAY SYSTEM AND IN-TRAIN INFORMATION DISTRIBUTION AND DISPLAY METHOD

(75) Inventors: Shigeru Kuroda, Chiyoda-ku (JP); Kenichi Ishiguri, Chiyoda-ku (JP); Masao Oki, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/390,413

(22) PCT Filed: Sep. 13, 2010

(86) PCT No.: PCT/JP2010/065756
§ 371 (c)(1),
(2), (4) Date: Feb. 14, 2012

(87) PCT Pub. No.: WO2011/034029
PCT Pub. Date: Mar. 24, 2011

(65) Prior Publication Data
US 2012/0144421 A1  Jun. 7, 2012

(30) Foreign Application Priority Data
Sep. 18, 2009  (JP) .................................. 2009-217193

(51) Int. Cl.
*H04N 21/262* (2011.01)

(52) U.S. Cl.
USPC ............................................. 725/74; 725/36

(58) Field of Classification Search
None
See application file for complete search history.

(56) References Cited

U.S. PATENT DOCUMENTS

| 2006/0212900 A1* | 9/2006 | Ismail et al. ..................... 725/34 |
| 2006/0248555 A1* | 11/2006 | Eldering ......................... 725/34 |
| 2011/0321101 A1* | 12/2011 | Newville et al. ................ 725/80 |

FOREIGN PATENT DOCUMENTS

| JP | 2003-179899 A | | 6/2003 | |
| JP | 2005-275233 | * | 10/2005 | ............. G09F 21/04 |
| JP | 2005-275233 A | | 10/2005 | |
| JP | 2006-251514 | * | 9/2006 | ............. G09F 21/04 |
| JP | 2006-251514 A | | 9/2006 | |
| JP | 2008-085685 | * | 4/2008 | ............. H04N 7/173 |

(Continued)

OTHER PUBLICATIONS

International Search Report (PCT/ISA/210) issued on Oct. 26, 2010, by Japanese Patent Office as the International Searching Authority for International Application No. PCT/JP2010/065756.
Written Opinion (PCT/ISA/237) issued on Oct. 26, 2010, by Japanese Patent Office as the International Searching Authority for International Application No. PCT/JP2010/065756.

(Continued)

*Primary Examiner* — Rong Le
(74) *Attorney, Agent, or Firm* — Buchanan Ingersoll & Rooney PC

(57) ABSTRACT

An in-train information distribution and display system and enables dynamic selection and display of contents having higher advertising effectiveness according to train information. A first program listing having time slots set therein and a plurality of advertising content data associated with each of the time slots of the first program listing, as candidates for program material, are prepared in a ground content-distribution server. An on-board central-distribution server determines the program material by selecting one of the plural advertising content data associated with each of the time slots of the first program listing, based on train information and passenger information obtained from a train-information central unit. A program listing having determined program materials constitutes a second program listing. Video terminals render advertising content data allocated to the respective time slots according to the second program listing and display the advertising content data as advertising information on displays.

7 Claims, 15 Drawing Sheets

(56) References Cited

FOREIGN PATENT DOCUMENTS

| | | |
|---|---|---|
| JP | 2008-085685 A | 4/2008 |
| JP | 2009-015239 A | 1/2009 |
| JP | 2009-070120 A | 4/2009 |

OTHER PUBLICATIONS

Office Action from Korean Patent Office dated Apr. 19, 2013, issued in corresponding Korean Patent Application No. 10-2012-7003627, with English translation thereof. (8 pages).

* cited by examiner

FIG.4

| No | TIME SLOT TEMPLATE NAME | MORNING AND EVENING RUSH HOURS | HOLIDAYS AND DAYTIME | NIGHTTIME | AIR-TIME PERIOD |
|---|---|---|---|---|---|
| 1 | | 2009-1-3 TO 2009-4-30 INFORMATION PROGRAM 1 (RECRUITMENT PROGRAM) | 2009-1-3 TO 2009-4-30 INFORMATION PROGRAM 1 (LESSON INFORMATION) | 2009-1-3 TO 2009-4-30 INFORMATION PROGRAM 1 (RECRUITMENT PROGRAM) | 2009-1-3 TO 2009-4-30 |
| 2 | | 2009-1-3 TO 2009-4-30 INFORMATION PROGRAM 2 (METEOROLOGICAL INFORMATION PROGRAM) (STOCK MARKET INFORMATION) | 2009-1-3 TO 2009-4-30 INFORMATION PROGRAM 2 (METEOROLOGICAL INFORMATION PROGRAM) (SHOPPING INFORMATION) | 2009-1-3 TO 2009-4-30 INFORMATION PROGRAM 2 (METEOROLOGICAL INFORMATION PROGRAM) (STOCK MARKET INFORMATION) | 2009-1-3 TO 2009-2-28 2009-3-1 TO 2009-4-30 |
| ... | | ... | ... | ... | ... |
| 80 | | 2009-12-1 TO 2009-12-31 INFORMATION PROGRAM 80 (OO UNIVERSITY) | 2009-12-1 TO 2009-12-31 INFORMATION PROGRAM 80 (PART-TIME JOB INFORMATION) | 2009-12-1 TO 2009-12-31 INFORMATION PROGRAM 80 (OO UNIVERSITY) | 2009-12-1 TO 2009-12-31 |

FIG.5

| No | TIME SLOT TEMPLATE NAME (PROGRAMS FOCUSED ON CLIENT INFORMATION IN UNITS OF CARS) | | | | AIR-TIME PERIOD |
|---|---|---|---|---|---|
| | FOR WOMEN | FOR BUSINESSMEN | FOR SENIORS | | |
| 1 | 2009-1-3 TO 2009-4-30 INFORMATION PROGRAM 1 (RECRUITMENT PROGRAM) | 2009-1-3 TO 2009-4-30 INFORMATION PROGRAM 1 (LESSON INFORMATION) | 2009-1-3 TO 2009-4-30 INFORMATION PROGRAM 1 (RECRUITMENT PROGRAM) | | 2009-1-3 TO 2009-4-30 |
| 2 | 2009-1-3 TO 2009-4-30 INFORMATION PROGRAM 2 (METEOROLOGICAL INFORMATION PROGRAM) (STOCK MARKET INFORMATION) | 2009-1-3 TO 2009-4-30 INFORMATION PROGRAM 2 (METEOROLOGICAL INFORMATION PROGRAM) (SHOPPING INFORMATION) | 2009-1-3 TO 2009-4-30 INFORMATION PROGRAM 2 (METEOROLOGICAL INFORMATION PROGRAM) (STOCK MARKET INFORMATION) | | 2009-1-3 TO 2009-2-28 2009-3-1 TO 2009-4-30 |
| ... | ... | ... | ... | | ... |
| 80 | 2009-12-1 TO 2009-12-31 INFORMATION PROGRAM 80 (OO UNIVERSITY) | 2009-12-1 TO 2009-12-31 INFORMATION PROGRAM 80 (PART-TIME JOB INFORMATION) | 2009-12-1 TO 2009-12-31 INFORMATION PROGRAM 80 (OO UNIVERSITY) | | 2009-12-1 TO 2009-12-31 |

FIG.6

| No | TIME SLOT TEMPLATE NAME (PROGRAMS FOCUSED ON CLIENT INFORMATION IN UNITS OF CARS) | | | | AIR-TIME PERIOD |
|---|---|---|---|---|---|
| | | FOR WOMEN | | | |
| | | RUSH HOURS | HOLIDAYS | NIGHTTIME | |
| 1 | | 2009-1-3 TO 2009-4-30 INFORMATION PROGRAM 1 (RECRUITMENT PROGRAM) | 2009-1-3 TO 2009-4-30 INFORMATION PROGRAM 1 (LESSON INFORMATION) | 2009-1-3 TO 2009-4-30 INFORMATION PROGRAM 1 (RECRUITMENT PROGRAM) | 2009-1-3 TO 2009-4-30 |
| 2 | | 2009-1-3 TO 2009-4-30 INFORMATION PROGRAM 2 (METEOROLOGICAL INFORMATION PROGRAM) (STOCK MARKET INFORMATION) | 2009-1-3 TO 2009-4-30 INFORMATION PROGRAM 2 (METEOROLOGICAL INFORMATION PROGRAM) (SHOPPING INFORMATION) | 2009-1-3 TO 2009-4-30 INFORMATION PROGRAM 2 (METEOROLOGICAL INFORMATION PROGRAM) (STOCK MARKET INFORMATION) | 2009-1-3 TO 2009-2-28 2009-3-1 TO 2009-4-30 |
| ... | | ... | ... | ... | ... |
| 80 | | 2009-12-1 TO 2009-12-31 INFORMATION PROGRAM 80 (OO UNIVERSITY) | 2009-12-1 TO 2009-12-31 INFORMATION PROGRAM 80 (PART-TIME JOB INFORMATION) | 2009-12-1 TO 2009-12-31 INFORMATION PROGRAM 80 (OO UNIVERSITY) | 2009-12-1 TO 2009-12-31 |

FIG.8

| | BUSINESS | WOMEN | HOMEMAKERS | SENIORS | AGED 15 AND UNDER | FAMILIES |
|---|---|---|---|---|---|---|
| 08:00:01 TO 08:00:30 | SOFT DRINK AND BEER (THERE ARE CONTENTS FOR BUSINESSMEN, FOR WOMEN, FOR HOMEMAKERS, FOR SENIORS AND THE LIKE) | | | | | |
| 08:00:31 TO 08:01:00 | GAMES | | | | | |
| 08:01:01 TO 08:01:30 | TRAVEL AGENCIES | | | | | |
| 08:01:31 TO 08:02:00 | INFORMATION RELATED TO RECRUITMENT | | | | | |
| 08:02:01 TO 08:02:30 | CM FOR UNIVERSITIES | | | | | |
| 08:02:31 TO 08:03:00 | CM FOR RAILWAY SERVICE COMPANIES | | | | | |

FIG.14

| No | TIME SLOT TEMPLATE NAME | SPECIFIED STATION, AIRTIME, DESIGNATION OF UPBOUND OR DOWNBOUND AND THE LIKE | PERIOD |
|---|---|---|---|
| 1 | 2009-4-1 TO 2009-4-30 DEPARTMENT STORE A | SHINJUKU STATION, MORNING, UP AND DOWN LINES | 2009-4-1 TO 2009-4-30 |
| 2 | 2009-5-1 TO 2009-5-31 INTERNATIONAL FORUM, DEPARTMENT STORE B | TOKYO STATION, ALL DAY, UP AND DOWN LINES TOKYO STATION, ALL DAY, UP AND DOWN LINES | 2009-5-1 TO 2009-5-6 2009-5-10-2009-5-20 |
| 3 | 2009-6-1 TO 2009-6-30 DEPARTMENT STORE C | IKEBUKURO STATION, NIGHT, UP AND DOWN LINES | 2009-6-5 TO 2009-6-10 |

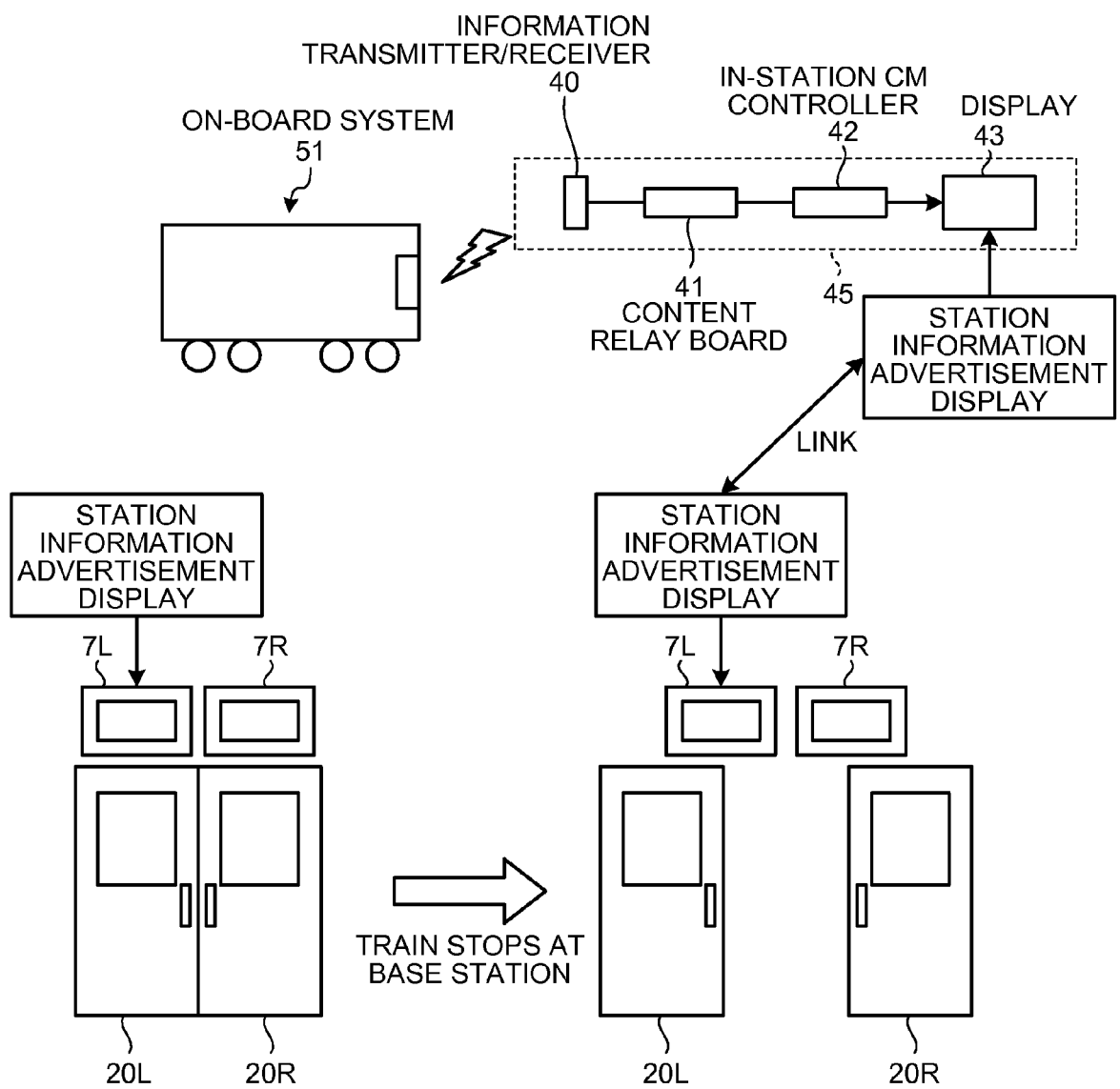

IN-TRAIN INFORMATION DISTRIBUTION AND DISPLAY SYSTEM AND IN-TRAIN INFORMATION DISTRIBUTION AND DISPLAY METHOD

FIELD

The present invention relates to an in-train information distribution and display system and an in-train information distribution and display method that enable to distribute and display information such as advertisements in trains.

BACKGROUND

In-train information distribution and display systems that distribute and display advertising information, guidance information and the like, using display devices installed in trains have been recently utilized.

An in-train information display system disclosed in Patent Literature 1 is an example of this type of system. In Patent Literature 1, a plurality of display devices having a small camera mounted thereon are installed in cars and contents to be displayed on the display devices are determined based on video data taken by the small cameras. Specifically, information about faces of persons that observe display screens of the display devices, the number of persons, the sex thereof and the like are recognized based on the video data taken by the small cameras, and contents to be displayed on the display devices are determined based on the information. Further, information extracted from the video data is transmitted to a content server on the ground, a distribution schedule is created by the content server, and the created distribution schedule is distributed to an on-board server together with the corresponding contents.

Patent Literature 2 describes a train-mounted video-information distribution and display system that provides video information to passengers in cars of a train. According to this system, one or more pieces of video information determined based on segmentation information for specifying a predetermined section within a running section of a train are contained in displayed programs, and the determined one or more pieces of video information are repeatedly displayed in the predetermined section.

CITATION LIST

Patent Literatures

Patent Literature 1: Japanese Patent Application Laid-open No. 2008-85685
Patent Literature 2: Japanese Patent Application Laid-open No. 2009-15239

SUMMARY

Technical Problem

However, because the display contents are determined only based on the information extracted from the video data in Patent Literature 1 mentioned above, it is difficult to select display contents by considering train information such as a train position. Furthermore, Patent Literature 1 does not specifically disclose a process of selecting the information to be displayed or determining the contents.

Furthermore, in Patent Literature 2 mentioned above, the video information to be displayed needs to be previously determined with respect to each section and it is difficult to flexibly select video information having higher advertising effectiveness according to the train information and display the selected video information. Accordingly, it is hard to appropriately respond to various needs of advertising companies.

The present invention has been achieved in view of the above problems and an object of the present invention is to provide an in-train information distribution and display system and an in-train information distribution and display method that enable to dynamically select display contents having higher advertising effectiveness according to train information and to display the selected contents.

Solution to Problem

In order to solve the above problem and in order to attain the above object, in an in-train information distribution and display system that enables to display a plurality of pieces of advertising information on displays in a train according to a program listing, the system of the present invention, includes: a ground content-distribution server that associates a plurality of advertising content data as candidates of program materials with time slots that are set in a first program listing, attaches auxiliary information that is to be attached to each of the advertising content data and that can be compared with train information collected on the train as an attribute tag group to each of the advertising content data, and then transmits the first program listing and the advertising content data associated with the time slots of the first program listing to the train; an on-board central-distribution server that receives the first program listing and the advertising content data associated with the time slots of the first program listing from the ground content-distribution server, obtains the train information from the ground content-distribution server, compares the attribute tag group with the train information with respect to each of the advertising content data associated with the time slots, determines one of the plural advertising content data to be allocated to each of the time slots based on a corresponding comparison result, thereby creating a second program listing from the first program listing, and distributes the second program listing and the advertising content data allocated to time slots of the second program listing to each car; and a video terminal that displays the advertising content data allocated to each of the time slots on the displays according to the second program listing.

Advantageous Effects of Invention

According to the present invention, display contents having higher advertising effectiveness can be dynamically selected according to train information and can be displayed.

BRIEF DESCRIPTION OF DRAWINGS

FIG. 4 is a specific example of a first program listing.
FIG. 5 is another specific example of the first program listing.
FIG. 6 is still another specific example of the first program listing.

FIG. 8 is an explanatory diagram of an example of edition of the first program listing in the ground system.

FIG. 14 is an example of a program listing for station information advertisements.

FIG. 15 is a schematic diagram of a video display method according to a third embodiment.

DESCRIPTION OF EMBODIMENTS

Exemplary embodiments of an in-train information distribution and display system and an in-train information distribution and display method according to the present invention will be explained below in detail with reference to the accompanying drawings. The present invention is not limited to the embodiments.

First Embodiment

Figure 1:
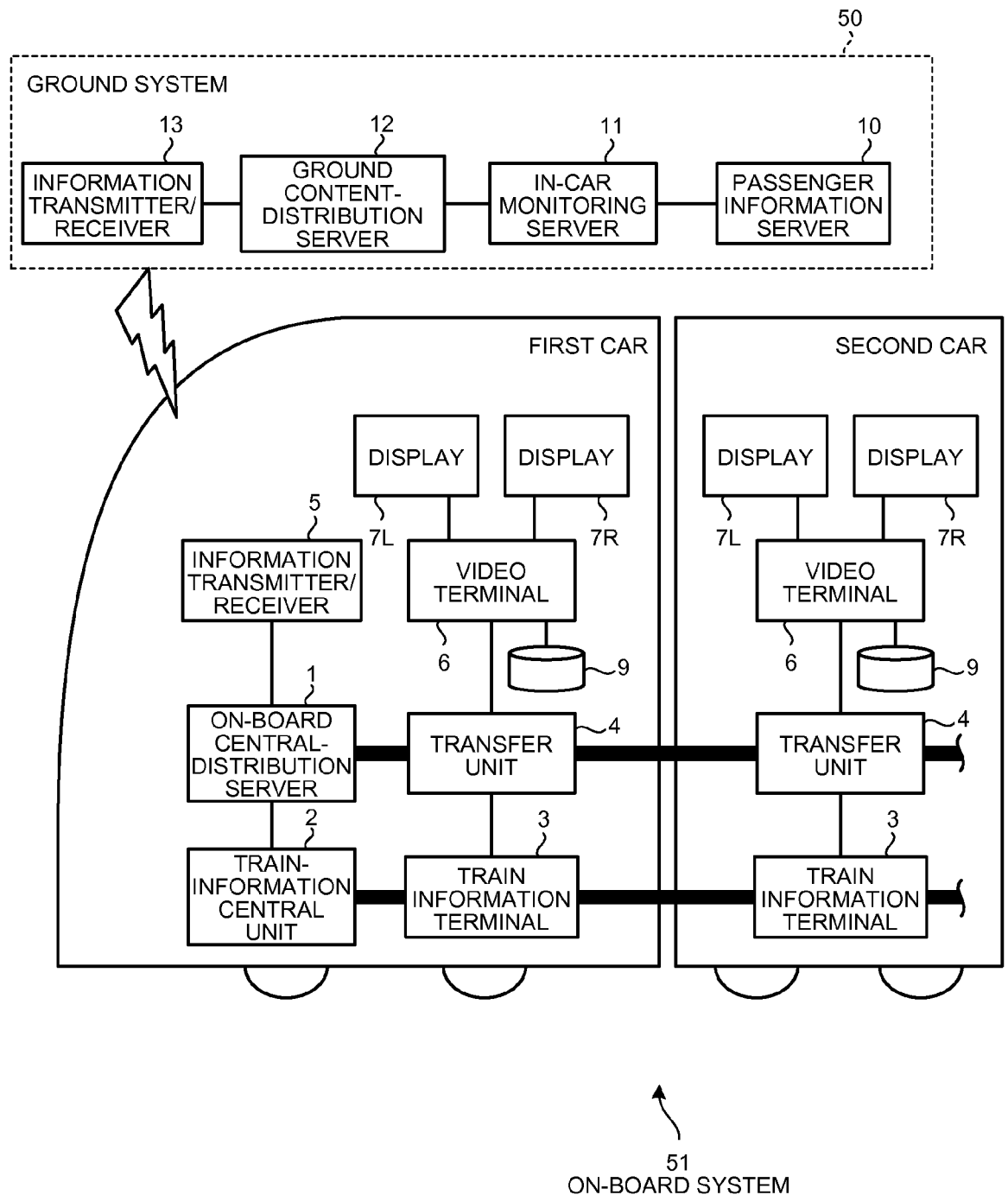
FIG. 1 depicts a schematic configuration of an in-train information distribution and display system according to a first embodiment.
Figure 2:
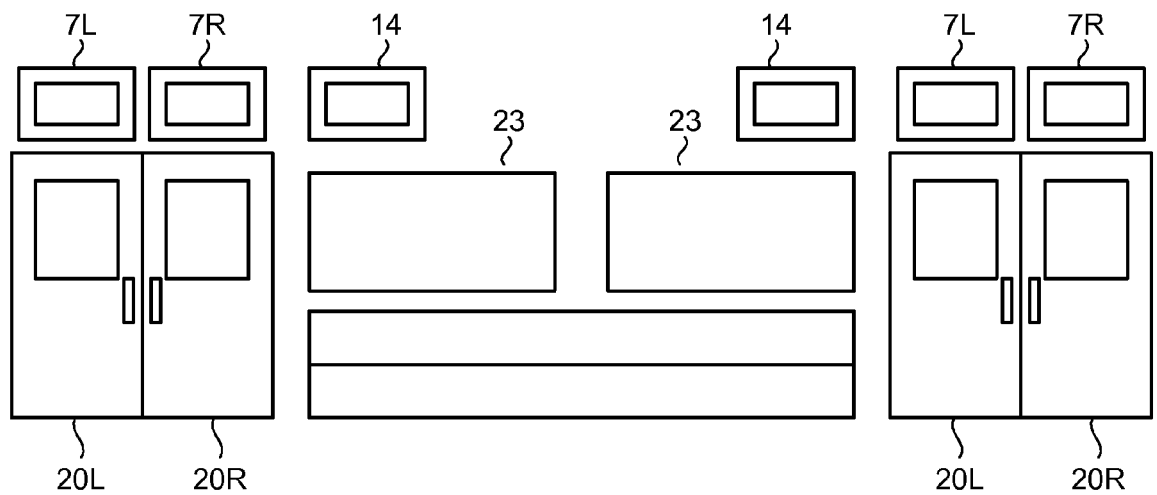
FIG. 2 is an installation example of displays 7L and 7R in a car.
Figure 3:
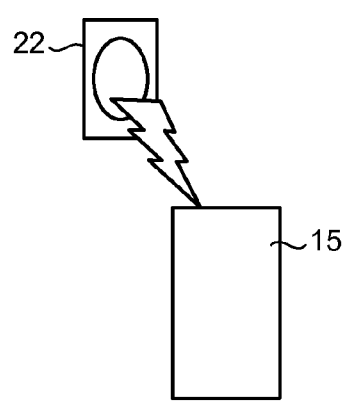
FIG. 3 is a schematic diagram of an example of collection of passenger information by an automatic ticket checker.

FIG. 1 depicts a schematic configuration of an in-train information distribution and display system according to a first embodiment of the present invention, FIG. 2 is an installation example of displays in a car of a train, and FIG. 3 is a schematic diagram of an example of collection of passenger information by an automatic ticket checker.

As shown in FIG. 1, an in-train information distribution and display system according to the present embodiment includes a ground system 50 and an on-board system 51 that is mounted on a train and can wirelessly transmit or receive data to or from the ground system 50.

The ground system 50 includes a passenger information server 10, an in-car monitoring server 11, a ground content-distribution server 12, and an information transmitter/receiver 13.

The passenger information server 10 manages passenger information related to passengers who use trains, and the passenger information is collected during ticket checking at each station, for example. FIG. 3 depicts an example of ticket checking using a noncontact IC card 15, in which transmission and reception of data is performed through wireless communication between the IC card 15 and an automatic ticket checker 22 using radio waves emitted from the automatic ticket checker 22. During the ticket checking, passenger information is obtained from client information in the IC card 15 and the obtained passenger information is transmitted to the passenger information server 10. That is, client information related to an owner of the IC card 15 is stored in a storage unit (not shown) embedded in the IC card and the IC card 15 wirelessly transmits the client information read from the storage unit to the automatic ticket checker 22 as the passenger information of a passenger carrying the IC card 15, using a wireless communication function. The automatic ticket checker 22 is connected to the passenger information server 10, and the automatic ticket checker 22 transmits the passenger information received from the IC card 15 to the passenger information server 10 using a wireless communication function. The passenger information server 10 is connected to the ground content-distribution server 12 and transmits the passenger information to the ground content-distribution server 12. In the example shown, the passenger information server 10 is connected to the ground content-distribution server 12 via the in-car monitoring server 11. The passenger information obtained by the automatic ticket checker 22 when the passenger uses the IC card 15 includes (client) information of the age and sex of the passenger, for example. When a passenger uses a ticket or a coupon ticket instead of the IC card 15, the automatic ticket checker 22 can obtain destination information as the passenger information. When a passenger uses a commuter pass, the automatic ticket checker 22 can obtain age and sex information recorded in the commuter pass, in addition to the destination information, as the passenger information. The passenger information server 10 is a computer including a CPU, a memory, a storage device and the like (not shown), and the CPU performs a control process according to a control program stored in the memory. The passenger information server 10 has a passenger-information collecting function to collect the passenger information obtained by the automatic ticket checker 22 as described above as a function realized by the control process of the CPU, and records the collected passenger information in the storage device to manage the information.

The in-car monitoring server 11 analyses videos taken by monitoring cameras (not shown) installed in cars of trains, for example, to extract passenger information and manage the information. The passenger information to be extracted includes information about the age and sex of passengers, a ratio between men and women, determination as to whether the passengers are commuters or commuter students and the like. The videos taken by the monitoring cameras (not shown) installed in the cars are transmitted from the monitoring cameras to train information terminals 3, for example, further transmitted by a train-information central unit 2, and then transmitted from the train to the ground through wireless communication between information transmitters/receivers 5 and 13 to be transmitted to the in-car monitoring server 11. It is also possible to analyze videos of monitoring cameras (not shown) installed on station platforms in the same manner to extract passenger information. The analysis of the videos and the extraction of the passenger information can be performed using a known method, for example. The in-car monitoring server 11 is connected to the ground content-distribution server 12 and transmits the passenger information extracted by analyzing the videos of the monitoring cameras to the ground content-distribution server 12. The in-car monitoring server 11 is a computer including a CPU, a memory, a storage device and the like (not shown) and the CPU performs a control process according to a control program stored in the memory. The in-car monitoring server 11 has a video-information analyzing function to extract the passenger information by analyzing the videos as described above as a function realized by the control process of the CPU, and records the extracted passenger information in the storage device to manage the information. In this way, the in-car monitoring server 11 and the passenger information server 10 are installed in the ground system 50, for example, and this configuration enables to centrally manage processes for a plurality of units.

The ground content-distribution server 12 creates a first program listing that becomes a base of a program listing to be used when advertising videos are displayed on the train. In this case, the first program listing is a program listing in which only time slots are set and program materials are not determined. However, a plurality of advertising content data as candidates of program materials are associated with each of the time slots, as explained below. That is, only the time slots and candidates therefor are determined and program materials are not determined yet on the ground. Further, auxiliary information that can be compared to check whether the information matches train information collected on the train (or the train information and the passenger information) is attached to the advertising content data associated with each time slot of the first program listing. Plural pieces of the auxiliary information are usually attached as tags to each of advertising contents as explained below and such a group of the auxiliary information is hereinafter referred to as "attribute tag group of each advertising content data". Attachment of an attribute tag to the advertising content data is determined with respect to each advertising content by reflecting demands of advertising companies, for example. The ground content-distribution server 12 transmits the first program listing and the advertising content data associated with each time slot of the first program listing to the on-board system 51 through the information transmitter/receiver 13. The information transmitter/receiver 13 is provided at a base station, for example, and transmits the first program listing and the advertising content data associated with each time slot of the first program listing to the on-board system 51 of the train when the train arrives at the base station.

While the first program listing usually has a plurality of time slots, plural advertising content data need not to be associated with all the time slots, respectively. That is, it suffices that the plural advertising content data are associated with one or more time slots, respectively, as described above and there can be a time slot having a program material already determined.

The on-board system 51 includes an on-board central-distribution server 1, the train-information central unit 2, the train information terminals 3, transfer units 4, the information transmitter/receiver 5, video terminals 6, displays 7L and 7R, and storage devices 9. The example shown here represents a first car and a second car in a train unit including a plurality of cars.

The train-information central unit 2 is a central unit for a train information device, which is mounted on the first car, for example. The train information terminal 3 is a terminal for the train information device, which is mounted on each car. The train-information central unit 2 and the train information terminals 3 are connected via a transmission line and collect train information in cooperation with each other. That is, the train information terminals 3 of the respective cars collect the train information of the corresponding cars and transmit the collected train information to each other to share the information. The train-information central unit 2 controls the train information terminals 3. The train information includes train identification information such as a train type, train position information such as a kilometrage and a running area, train service information such as stops, a line, a destination, estimated arrival times, and presence or absence of woman-only cars, train current state information such as the current time, arrival times, and the number of passengers, train command information such as a door opening/closing command and a stop command, meteorological information such as temperature (ambient temperature) information and the like.

The on-board central-distribution server 1 receives the first program listing and the advertising content data associated with each time slot of the first program listing from the ground content-distribution server 12 through the information transmitter/receiver 5. The on-board central-distribution server 1 is connected to the train-information central unit 2 and obtains various types of train information from the train-information central unit 2. The on-board central-distribution server 1 compares the attribute tag group attached to each of the advertising content data that are associated with the time slots of the first program listing with the train information, and selects one advertising content data from among the plural advertising content data (that is, program material candidates) associated with each time slot based on a result of the comparison (a result of match or mismatch, for example). The attribute tag group can contain the auxiliary information that can be compared with the passenger information. In this case, the attribute tag group is compared with the train information and the passenger information, and one advertising content data is selected from among the plural advertising content data associated with each time slot based on the comparison result. Attribute tags that can be compared with the passenger information include "businessmen (many)", "families (many)", "people in leisure time (many)", "women (many)", "students (many)", and "general persons (many)", for example. In this way, the on-board central-distribution server 1 determines program materials of the first program listing, and the program listing in which the materials of the first program listing have been determined is hereinafter referred to as "second program listing".

The selection of the advertising content data in the time slot is performed by referring to latest train information obtained in real time from the train-information central unit 2 and comparing the train information with the attribute tag group, for example, using the attribute tag group which is the auxiliary information, as a key. In a case where advertisements in a time slot are of a beverage company, the on-board central-distribution server 1 selects an advertisement for beer when the temperature obtained as the train information is 30° C. or higher and selects an advertisement for canned hot coffee when the temperature is 10° C. or lower. In this case, it suffices that advertisement content data having beer as a material and advertisement content data having canned hot coffee as a material are associated with the same time slot as advertising contents and that "30° C. or higher" is attached to the former and "10° C. or lower" is attached to the latter as the attribute tags. As a result of comparison between the temperature information as one of the train information and the attribute tags, the on-board central-distribution server 1 can determine that the temperature information matches the attribute tag of the former when the temperature is 30° C. or higher, for example, and therefore can select the advertising content data having the material of beer as the advertising content data to be allocated to the time slot. Accordingly, an advertisement that meets needs of the passengers can be displayed according to the current temperature and greater enhancement of advertisement effectiveness is expected.

In another example of the selection of the advertising content in the time slot, an advertisement suitable to show in the morning or in the evening, for example, can be selected according to time information as the train information. In another example, when there is a women-only car in the train, an advertisement for women can be selected based on a car number of the women-only car as the train information and shown in the car. In still another example, according to destination information as the train information, an advertisement suitable for residential districts can be selected when the train is bound for a residential district, and another advertisement suitable for the city center can be selected when the train is bound for the city center.

The on-board central-distribution server 1 creates the second program listing from the first program listing and then distributes the second program listing and the advertising content data allocated to each time slot of the second program listing to the video terminal 6 of each car through the transfer unit 4 of each car.

The video terminal 6 stores the data distributed from the on-board central-distribution server 1 in the storage device 9, and also successively retrieves the advertising content data corresponding to the program material from the storage device 9 according to the second program listing and images the data to be displayed on the display 7L, for example. The video terminal 6 performs display control of the displays 7L and 7R. The storage device 9 that stores therein the data distributed from the on-board central-distribution server 1 can be embedded in the video terminal 6 or externally mounted thereon, for example; however, the storage device 9 is not limited thereto and can be embedded in the display 7L. Alternatively, the storage device 9 can be installed in the on-board central-distribution server 1, for example, instead of being installed in the video terminal 6 or the display 7L. In this case, the on-board central-distribution server 1 successively transmits the advertising content data for each program to the video terminal 6 according to the second program listing.

Here, a plurality of the second program listings can be created. For example, the on-board central-distribution server 1 can create plural different second program listings for respective cars to provide advertising information according to the different second program listings for the respective cars. Furthermore, the on-board central-distribution server 1 can create the plural different second program listings to use the program listings even in the same car. For example, when there is a display 7L placed on a side (sea side) where the sea can be seen from train windows and another display 7L placed on a side (mountain side) where a mountain can be seen from train windows in the same car, the on-board central-distribution server 1 can edit a second program listing for the display 7L on the sea side and a second program listing for the display 7L on the mountain side to have materials suitable for the sea side and the mountain side, respectively. At this time, the on-board central-distribution server 1 creates the second program listing for the display 7L on the sea side by specifying a running section in which the sea can be actually seen from the train windows, for example, based on running position information of the train obtained from the train-information central unit 2.

It is also possible that the ground system 50 sets plural different first program listings and the on-board central-distribution system 1 creates plural different second program listings based on the different first program listings. For example, when the ground content-distribution server 12 creates plural different first program listings from the passenger information obtained from the passenger information server 10 and the in-car monitoring server 11, specifically when it is determined from the passenger information that businessmen and women occupy the majority of the passengers in some cars, for example, the ground content-distribution server 12 creates a first program listing for businessmen and a first program listing for women, performs association of the advertising content data and attachment of the attribute tag group to each of the time slots, and then transmits the data to the on-board system 51. The on-board central-distribution server 1 creates two or more second program listings based on these two first program listings and transmits the second program listings to the predetermined cars, respectively.

FIG. 2 is an installation example of the displays 7L and 7R in a car. As shown in FIG. 2, the displays 7L and 7R are placed over a pair of doors 20L and 20R, respectively. As described above, the displays 7L are used as advertising screens. The displays 7R are used as service information display screens, for example. Displays 14 are placed over train windows 23. The displays 14 are used as supplemental advertising screens linked to materials that are being displayed on the displays 7L, for example, and materials corresponding to moving image advertisements that are displayed on the displays 7L are displayed for a certain time (one minute, for example) mainly with still images of equivalent materials to print advertisements after the display on the displays 7L, thereby providing a stronger impression of advertising materials on the displays 7L.

FIGS. 4 to 6 are specific examples of the first program listing. FIG. 4 depicts a program listing for "morning and evening rush hours", a program listing for "holidays and daytime", and a program listing for "nighttime" shown side by side as the first program listings, and also depicts air-time periods of respective time slots. Furthermore, an "information program 1" to an "information program 80" are listed in the time slots of numbers (No.) 1 to 80, respectively, as program names (time slot template names). For example, in the program listing for "morning and evening rush hours", a meteorological information program is shown during a period "from Jan. 3, 2009 to Feb. 28, 2009" and a stock market information program is shown during a period "from Mar. 1, 2009 to Apr. 30, 2009" as the "information program 2". Because these are the time slots of the first program listing, the program materials are not determined and candidates of advertising contents are determined with respect to each time slot. However, it is not necessary that plural advertising content data are associated with all time slots as program candidates and it is possible that plural advertising content data are associated with one or more time slots as program candidates and one advertising content data is allocated to other time slots. As explained below, there can be a time slot to which no advertising content data is allocated. In FIG. 4, when the program listing for the "morning and evening rush hours" is selected as the first program listing, for example, materials of the time slots of the numbers 1 to 80 are determined (that is, the second program listing is created) on the train and then a program that meets the air-time period is repeatedly shown according to the second program listing.

FIG. 5 depicts a program listing "for women", a program listing "for businessmen", and a program listing "for seniors" shown side by side as the first program listings and also depicts air-time periods of respective time slots. For example, the program listing "for women" is edited in view of women's needs. Here, "for women", "for businessmen", and "for seniors" correspond to or match "many women", "many businessmen", and "many seniors" in the passenger information, respectively. The respective program listings show edition examples of programs focused on the passenger information. Other elements are the same as those in FIG. 4.

FIG. 6 depicts program listings "for women" as the first program listings, which are divided into a program listing for "rush hours", a program listing for "holidays", and a program listing for "nighttime". Other elements are the same as those in FIG. 5.

The ground content-distribution server 12 holds a plurality of program listing templates having time slots determined as shown in FIGS. 4 to 6, and selects as the first program listing, the program listing "for women" in FIG. 5 or one of the three program listings in FIG. 6 when it obtains from the passenger information obtained from the passenger information server 10 and the in-car monitoring server 11, information indicating that women occupy the majority of passenger in a car (women-only car, for example). That is, the ground content-distribution server 12 can select a program listing template focused on a passenger attribute that meets the passenger information from among the program listing templates corresponding to respective passenger attributes. As the program listing templates focused on the passenger information, various templates "for homemakers", "for persons aged 15 and under", "for families" and the like are conceivable in addition to those shown in FIG. 5. The ground content-distribution server 12 can have program listing templates corresponding to respective passenger attributes such as the age, sex, and occupation of the passengers. The program listing templates are created by an advertising creating company, for example.

When the first program listing is created from the program listing templates shown in FIGS. 4 to 6, there is no need to associate the advertising content data with all the time slots No. 1 to 80 and some time slots can be associated with no advertising content data. In this case, it means that time slots having no advertising content data allocated thereto are included also in the second program listing that is created from the first program listing, and when no advertising content data is allocated to some time slots in the second program listing, the video terminals 6 skip the time slots (perform a nondisplay process). This enables display that does not make the passengers feel uncomfortable without interrupting the display. For example, when advertising content data is allocated to the time slot No. 1 of the second program listing, no advertising content data is allocated to the time slot No 2, and advertising content data is allocated to the time slot No. 3, the video terminals 6 show the advertising content allocated to the time slot No. 1 and then show the advertising content allocated to the time slot No. 3.

Figure 7:
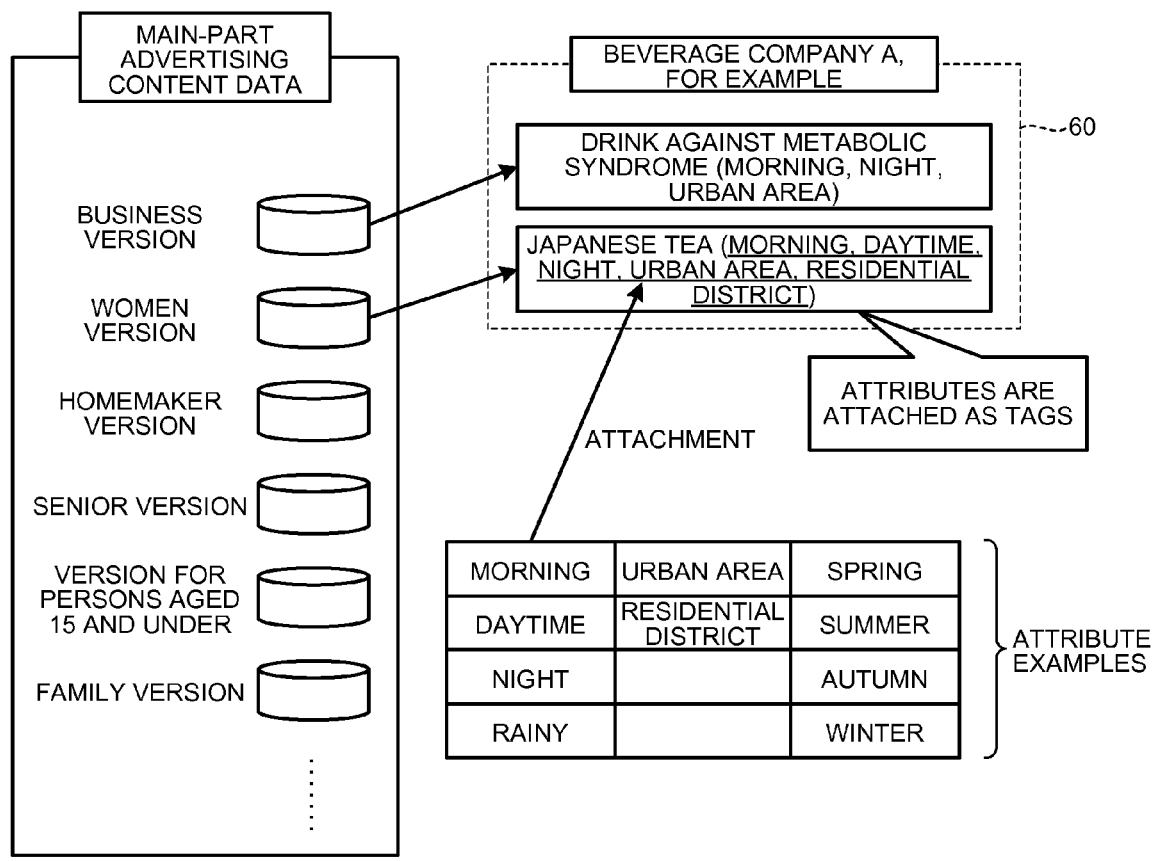
FIG. 7 is an explanatory diagram of a process of associating advertising content data with time slots in a ground system.

FIG. 7 is an explanatory diagram of a process of associating advertising content data with time slots in the ground system 50. This associating process is performed by the ground content-distribution server 12. FIG. 7 depicts an example in which advertising content data having a "drink against the metabolic syndrome" as a material is selected "for businessmen" and advertising content data having "Japanese tea" as a material is selected "for women", as advertising contents of a beverage company A. The advertising content data are edited as "a business version", "a women version", "a homemaker version", "a senior version", "a version for persons aged 15 and under", "a family version", . . . and stored in a storage unit of the ground content-distribution server 12.

Furthermore, "morning", "daytime", "night", "rainy", "urban area", "residential district", "spring", "summer", "autumn", and "winter" are displayed in FIG. 7 as examples of attributes to be attached to the advertising content data. Among these, "morning, night, and urban area" are attached to the "drink against the metabolic syndrome" as an attribute tag group, and "morning, daytime, night, urban area, and residential district" are attached to the "Japanese tea" as an attribute tag group.

In FIG. 7, the advertising content data for the "drink against the metabolic syndrome" having "morning, evening, and urban area" attached as the attribute tag group and the advertising content data for the "Japanese tea" having "morning, daytime, night, urban area, and residential district" attached as the attribute tag group are associated with a time slot 60 of the program listing template.

Figure 9:
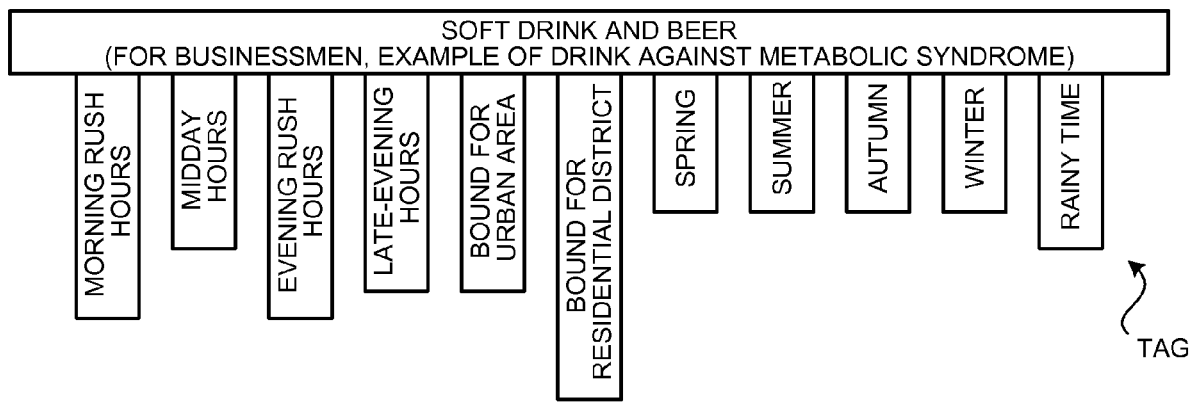
FIG. 9 is an example of advertising content data associated with a time slot and an attribute tag group attached to the advertising content data.

FIG. 8 is an example of edition of the first program listing in the ground system 50, and FIG. 9 is an example of advertising content data associated with a time slot and an attribute tag group attached to the advertising content data.

In FIG. 8, program listings (first program listings) "for businessmen", "for women", "for homemakers", "for seniors", "for persons aged 15 and under", and "for families" are shown side by side, and time slots are shown for respective time periods, for example. It indicates that in a time period between "08:00:01 to 08:00:30", for example, advertisements related to "soft drink and beer" are shown and that advertising contents to be associated with the corresponding time slot vary according to the passenger information as to whether it is "for businessmen", "for women" and the like.

FIG. 9 is an example in which the "drink against the metabolic syndrome" is associated with a program slot of "soft drink and beer" as one candidate of program materials for the program listing "for businessmen". Furthermore, "morning rush hours", "midday hours", "evening rush hours", "late-evening hours", "bound for urban area", "bound for residential district", "spring", "summer", "autumn", "winter", and "rainy time" are cited as examples of attribute tags attached to the advertising content data.

Figure 17:
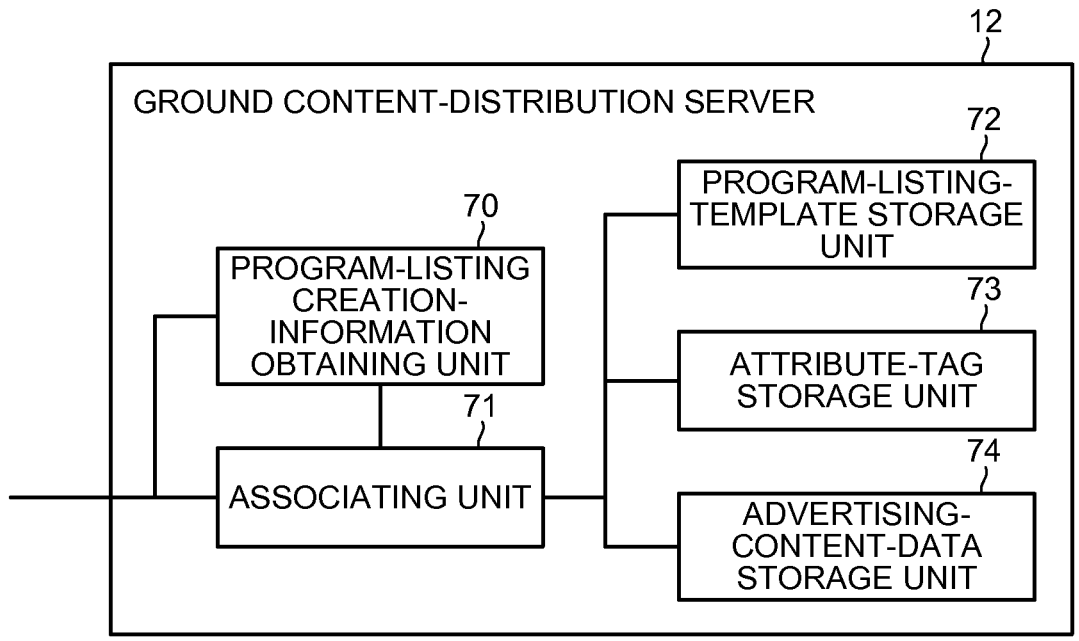
FIG. 17 is a block diagram of a schematic functional configuration of a ground content-distribution server.

A functional configuration of the ground content-distribution server 12 is explained. The ground content-distribution server 12 is a computer including a CPU, a memory, a storage device and the like (not shown) and the CPU performs a control process mentioned above according to a control program stored in the memory. FIG. 17 is a block diagram of a schematic functional configuration of the ground content-distribution server 12. As shown in FIG. 17, the ground content-distribution server 12 includes a program-listing creation-information obtaining unit 70, an associating unit 71, a program-listing-template storage unit 72, an attribute-tag storage unit 73, and an advertising-content-data storage unit 74. The program-listing creation-information obtaining unit 70 and the associating unit 71 are functions realized by the CPU that operates according to the control program stored in the memory, and the program-listing-template storage unit 72, the attribute-tag storage unit 73, and the advertising-content-data storage unit 74 include storages.

The program-listing-template storage unit 72 stores therein program listing templates. The program listing templates are the first program listings before the advertising content data are associated therewith and are those as shown in FIGS. 4 to 6, for example. The attribute-tag storage unit 73 stores therein attribute tags that can be attached to the advertising content data and has the attribute tags as the "attribute examples" shown in FIG. 7 stored therein, for example. The advertising-content-data storage unit 74 stores therein the advertising content data and corresponds to that shown as "main-part advertising content data" in FIG. 7, for example.

The program-listing creation-information obtaining unit 70 obtains program-listing creation information that is necessary to determine which program listing template is selected from the program-listing-template storage unit 72, which advertising content data is selected from the advertising-content-data storage unit 74 to be associated with each time slot of a selected program listing template, and which attribute tag is selected from the attribute-tag storage unit 73 to be attached to each advertising content data associated with each time slot. In this case, the program-listing creation information is setting information input from an input unit (not shown) of the ground content-distribution server 12, for example, in addition to the passenger information input from the passenger information server 10 and the in-car monitoring server 11, which has been already explained. The program-listing creation-information obtaining unit 70 determines the program listing template to be selected from the programlisting-template storage unit 72, the advertising content data to be selected from the advertising-content-data storage unit 74, and the attribute tag group to be selected from the attribute-tag storage unit 73 according to the program-listing creation information, and outputs select instruction information including determined details to the associating unit 71.

The associating unit 71 selects a program listing template from the program-listing-template storage unit 72, associates plural advertising content data selected from the advertising-content-data storage unit 74 with each time slot, for example, of the selected program listing template (first program listing), and attaches an attribute tag group selected from the attribute-tag storage unit 73 with each of the advertising content data according to the select instruction information to set the first program listing. The associating unit 71 transmits the first program listing and the advertising content data associated with the time slots of the first program listing to the on-board central-distribution server 1 through the information transmitter/receiver 13.

Figure 10:
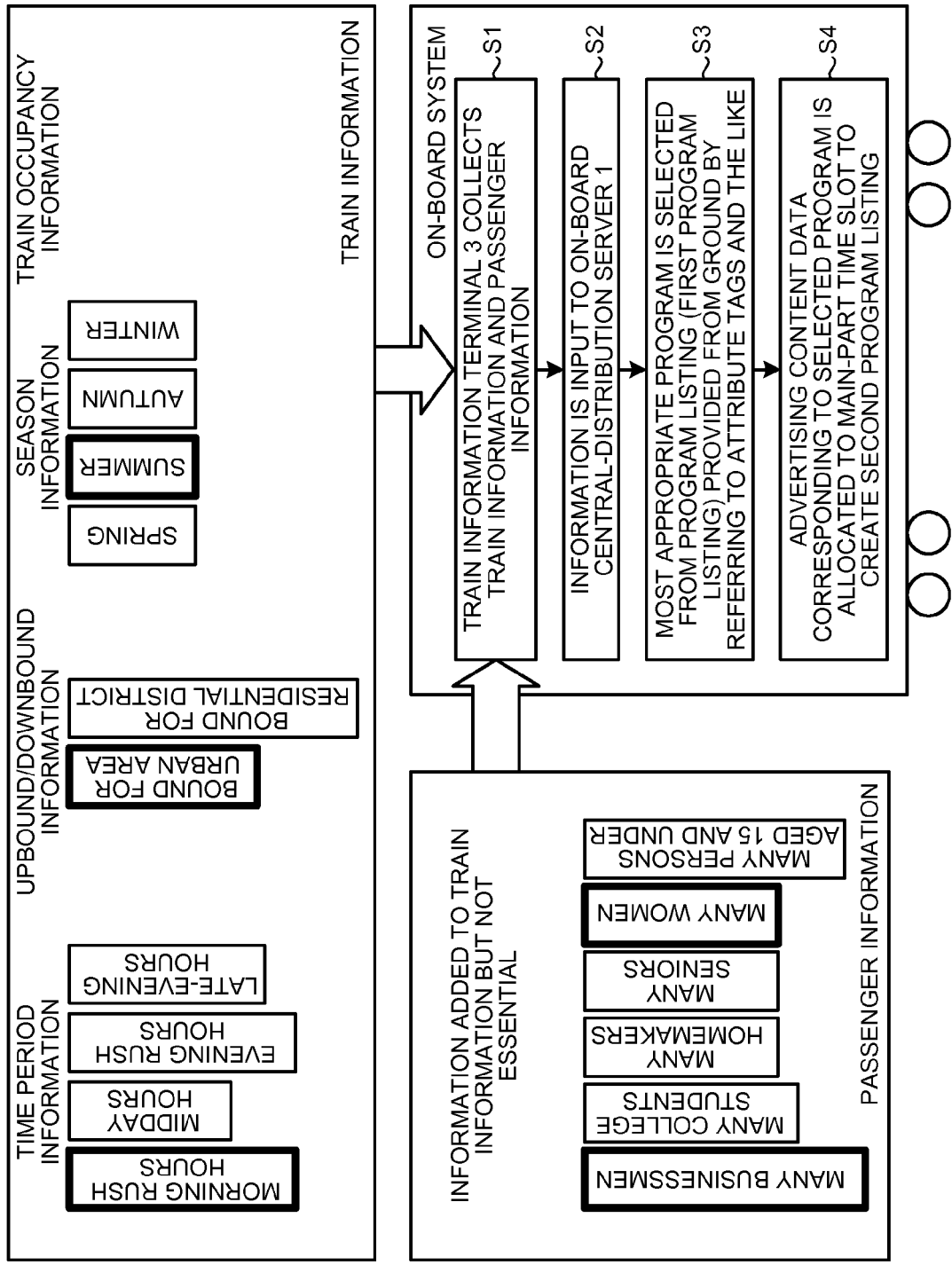
FIG. 10 is an explanatory diagram of a process of creating a second program listing in an on-board system.

FIG. 10 is an explanatory diagram of a process of creating the second program listing in the on-board system 51. The train information terminals 3 first collect the train information (S1). The train information includes "time period information", "upbound/downbound information", "season information", and "train occupancy information", for example. Specifically, in the example shown, the "time period information" indicates "morning rush hours", the "upbound/downbound information" indicates "bound for urban area", and the "season information" indicates "summer". The train information terminals 3 also collect the passenger information (S1). The train information terminals 3 can collect the passenger information from the in-car monitoring server 11 and the passenger information server 10, for example. For example, the in-car monitoring server 11 transmits the passenger information to the train through the information transmitter/receiver 13, and the passenger information received by the information transmitter/receiver 5 on the train is transmitted to the train information terminals 3 via the on-board central-distribution server 1 and the train-information central unit 2. The same holds for the passenger information server 10. Here, one or both of the in-car monitoring server 11 and the passenger information server 10 can be installed in cars, and the train information terminals 3 can obtain the passenger information from one or both of the in-car monitoring server 11 and the passenger information server 10 in the on-board system 51. It is also possible to provide a video-information analyzing function similar to that of the in-car monitoring server 11 to the train information terminals 3 and cause the train information terminals 3 to perform analysis of video information and extraction of passenger information. In the example shown, the passenger information collected by the train information terminals 3 is "many businessmen" and "many women". In this case, "many businessmen" indicates that there is a car in which businessmen occupy the majority and "many women" indicates that there is a women-only car, for example. The passenger information is information added to the train information and is not essential in the present embodiment. In other words, there is no need to provide the passenger information server 10 and the in-car monitoring server 11 in FIG. 1, and the second program listing can be created based on the train information from the first program listing that has been created without being based on the passenger information.

The information (the first program listing and the advertising content data associated with the time slots of the first program listing) from the ground system 50, and the train information and the passenger information from the train information terminals 3 is then input to the on-board central-distribution server 1 (S2). The train information and the passenger information from the train information terminals 3 is transmitted to the train-information central unit 2 and then transmitted from the train-information central unit 2 to the on-board central-distribution server 1. While the passenger information is input here from the train information terminals 3, the passenger information transmitted from the in-car monitoring server 11 and the passenger information server 10 of the ground system 50 can be input to the on-board central-distribution server 1 via the information transmitters/receivers 13 and 5.

The on-board central-distribution server 1 then selects a most appropriate program out of the first program listing as a program listing provided from the ground by referring to the attribute tags and the like (S3). Specifically, the on-board central-distribution server 1 compares with respect to each time slot of the first program listing, the train information (such as "morning rush hours", "bound for urban area", and "summer") with the attribute tag group of each advertising content data associated with the corresponding time slot and selects one advertising content data as an appropriate program from among plural program candidates. Various methods are conceivable as selection methods (that is, the criteria for "appropriate") at this time and advertising content data containing the most attribute tags that match the train information can be selected as a program material, for example. For example, when two advertising content data are associated with a time slot, and one of the content data has "morning rush hours", "bound for urban area", and "summer" as the attribute tags and the other has "morning rush hours" and "summer" as the attribute tags, the on-board central-distribution server 1 selects the former as a most appropriate program because the former contains more attribute tags that match the train information. The on-board central-distribution server 1 also can select advertising content data containing the most attribute tags that match the train information and the passenger information as the program material, for example. While the train information is provided here from the train-information central unit 2 and the train information terminals 3, the train information can be provided from other systems or servers. For example, a traffic control system (not shown) installed on the ground centrally manages traffic and the like of trains, and traffic control information held by the traffic control system can be transmitted as the train information from the ground to the train through ground-to-train wireless communication to be transferred to the on-board central-distribution server 1. That is, the train information is not limited to the information managed by the train-information central unit 2 and the train information terminals 3 and can be information generally related to the train.

The on-board central-distribution server 1 then allocates the advertising content data corresponding to the program selected at S3 to a main-part time slot to create the second program listing (S4). Note that "main part" of the main-part time slot is intended to distinguish from "station information advertisements", which is explained in a second embodiment, and indicates that this is advertisements mainly shown in the train.

Figure 18:
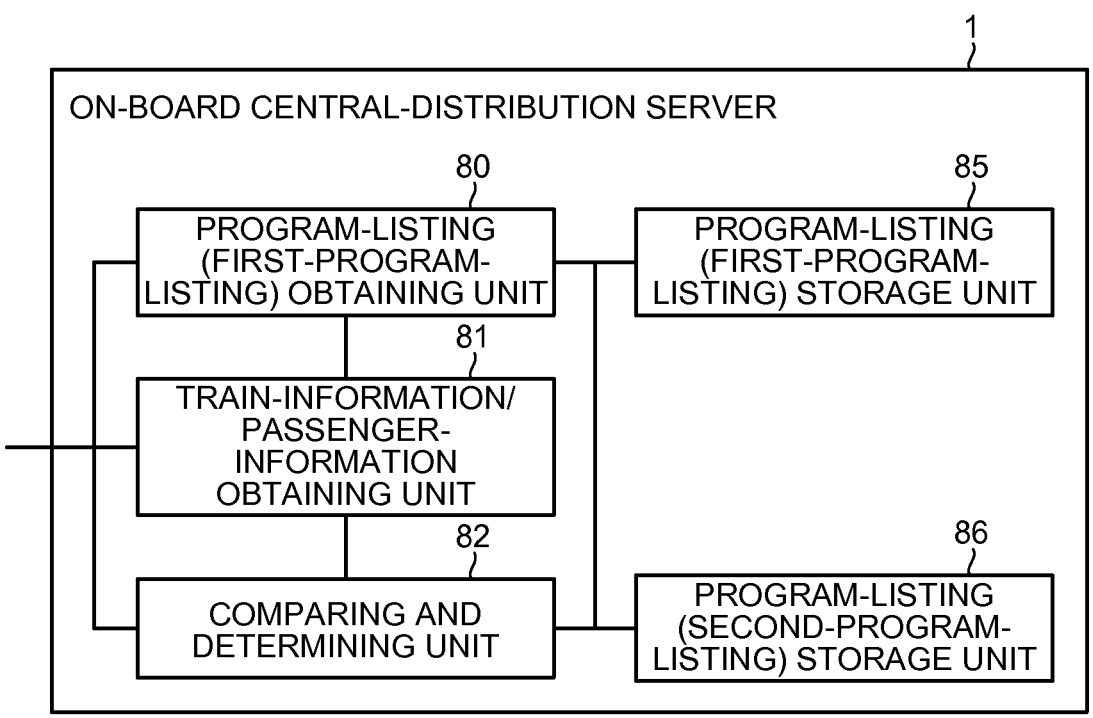
FIG. 18 is a block diagram of a schematic functional configuration of an on-board central-distribution server.

A functional configuration of the on-board central-distribution server 1 is explained here. The on-board central-distribution server 1 is a computer including a CPU, a memory, a storage device and the like (not shown), and the CPU performs a control process mentioned above according to a control program stored in the memory. FIG. 18 is a block diagram of a schematic functional configuration of the on-board central-distribution server 1. As shown in FIG. 18, the on-board central-distribution server 1 includes a program-listing (firstprogram-listing) obtaining unit 80, a train-information/passenger-information obtaining unit 81, a comparing and determining unit 82, a program-listing (first-program-listing) storage unit 85, and a program-listing (second-program-listing) storage unit 86. The program-listing (first-program-listing) obtaining unit 80, the train-information/passenger-information obtaining unit 81, and the comparing and determining unit 82 are functions realized by the CPU that operates according to the control program stored in the memory, and the program-listing (first-program-listing) storage unit 85 and the program-listing (second-program-listing) storage unit 86 include storages.

The program-listing (first-program-listing) obtaining unit 80 receives the first program listing and the advertising content data associated with time slots of the first program listing, which are transmitted from the ground content-distribution server 12, through the information transmitter/receiver 5 and stores the first program listing and the advertising content data associated with the time slots of the first program listing in the program-listing (first-program-listing) storage unit 85.

The train-information/passenger-information obtaining unit 81 obtains the train information and the passenger information from the train-information central unit 2, for example.

The comparing and determining unit 82 reads the first program listing and the advertising content data associated with the time slots of the first program listing from the program-listing (first-program-listing) storage unit 85, compares the attribute tag group with the train information and the passenger information, for example, with respect to each of advertising content data associated with the time slots of the first program listing, and determines one advertising content data to be allocated to each time slot among the plural advertising content data based on a result of the comparison (result of match or mismatch, for example), thereby creating the second program listing from the first program listing. The comparing and determining unit 82 stores the second program listing and the advertising content data allocated to the second program listing in the program-listing (second-program-listing) storage unit 86 and distributes the second program listing and the advertising content data to the video terminal 6 mounted on each car.

Figure 11:
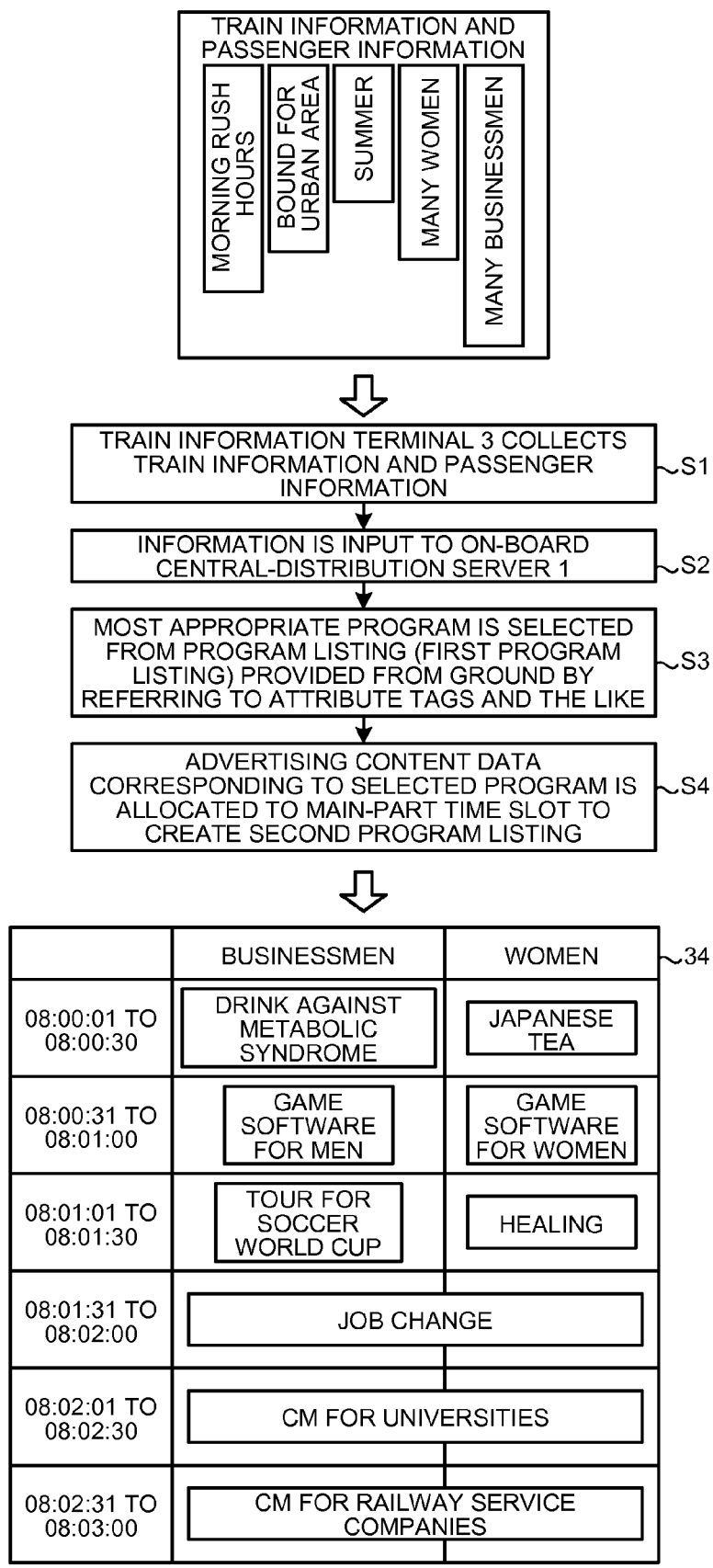
FIG. 11 is another explanatory diagram of a process of creating a second program listing in the on-board system.

FIG. 11 is another explanatory diagram of a process of creating the second program listing in the on-board system 51. As shown in FIG. 11, the train information and the passenger information ("morning rush hours", "bound for urban area", "summer", "many women", and "many businessmen") is collected by the train information terminals 3 as in FIG. 10. Operations at S1 to S4 are the same as in FIG. 10. FIG. 11 depicts a program listing 34 as a specific example of created second program listings. In this example, two second program listings for "businessmen" and for "women" are created based on the fact that the passenger information indicates "many women" and "many businessmen". That is, the ground content-distribution server 12 creates two first program listings based on the passenger information, transmits the created first program listings together with the advertising content data associated with the time slots to the on-board central-distribution server 1, and creates the two second program listings based on the two first program listings. For example, in a time period between "08:00:01 to 08:00:30", advertising information having the "drink against the metabolic syndrome" as a material is selected for "businessmen" and advertising information having the "Japanese tea" as a material is selected for "women". Furthermore, in a time period between "08:01:31 to 08:02:00", for example, advertising information having "job change" as a material is selected in common for "businessmen" and for "women".

Figure 12:
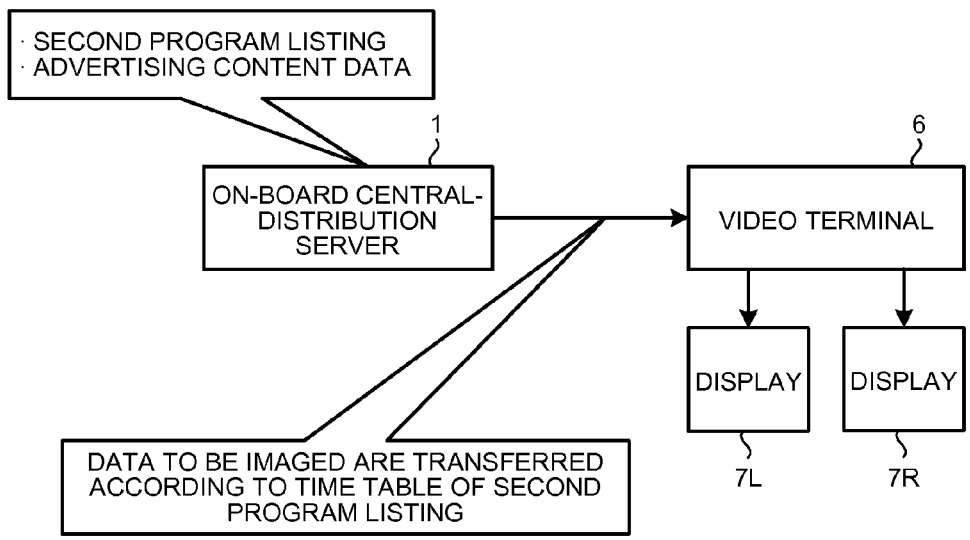
FIG. 12 is an explanatory diagram of data transfer from an on-board central-distribution server to a video terminal.

FIG. 12 is an explanatory diagram of data transfer from the on-board central-distribution server 1 to the video terminal 6. As shown in FIG. 12, the on-board central-distribution server 1 has the second program listing and the advertising content data associated with the time slots and transfers data to be imaged to the video terminal 6 according to a time table of the second program listing. That is, the on-board central-distribution server 1 transfers the second program listing and the advertising content data allocated to the time slots of the program listing to the video terminal 6. In the example of the program listing 34 shown in FIG. 11, the on-board central-distribution server 1 transfers the second program listing for "women" to a women-only car and transfers the second program listing for "businessmen" to other cars. Alternatively, it is possible to transfer the two second program listings to all the video terminals 6 and select one of the second program listings in each of the video terminals 6. The video terminal 6 images the advertising content data according to the second program listing and shows the advertising contents on the display 7L, for example.

The operation according to the present embodiment is summarized as follows. The ground content-distribution server 12 first associates plural advertising content data as program material candidates with the time slots of the first program listing to which the time slots are set, and attaches to each of the advertising content data, the information that is auxiliary information to be attached to each advertising content data and can be compared with the train information (or the train information and the passenger information) collected on the train as the attribute tag group. At this time, the time slots are set in the first program listing based on the passenger information, for example.

The ground content-distribution server 12 then transmits the first program listing and the advertising content data associated with the time slots of the first program listing to the on-board central-distribution server 1 though the information transmitter/receiver 13. The on-board central-distribution server 1 receives the first program listing and the advertising content data associated with the time slots of the first program listing transmitted from the ground content-distribution server 12 through the information transmitter/receiver 5 and obtains the train information and the passenger information from the train-information central unit 2.

The on-board central-distribution server 1 then compares the attribute tag group with the train information (or the train information and the passenger information) with respect to each of the advertising content data associated with the time slots of the first program listing, and determines one advertising content data to be allocated to each time slot among the plural advertising content data based on a result of the comparison, thereby creating the second program listing from the first program listing.

The on-board central-distribution server 1 then distributes the second program listing and the advertising content data allocated to the time slots of the second program listing to the video terminal 6 mounted on each car. The video terminal 6 images the advertising content data allocated to each time slot according to the second program listing and displays the imaged data as advertising information on the display 7L, for example.

As explained above, according to the present embodiment, display materials having higher advertising effectiveness can be dynamically selected according to the train information (or the train information and the passenger information) to display advertising information. That is, by enabling automatic allocation of advertising contents to time slots to which advertising contents to be displayed are not completely determined, program listing creation is automated and simplified and advertising effectiveness is enhanced.

According to the present embodiment, the program listing can be created according to the passenger information and thus video information reflecting passengers' needs can be provided in view of the attributes of the passengers.

To advertising companies, according to the present embodiment, more effective display methods for advertising information can be proposed and advertisement display methods having a high return to investment can be proposed. Furthermore, the advertising companies do not need to complete the program listings by themselves. With setting of time slots and setting of program candidates by the advertising companies, creation of a most appropriate program listing is performed automatically on the train based on the train information (or the train information and the passenger information).

While the display of the advertising information is performed using the displays 7L installed in the cars in the present embodiment, display for individuals can be also performed through portable terminals. In this case, the passengers perform registration in advance, for example, to enable provision of information from the on-board central-distribution server 1. For example, it suffices that a transmitter/receiver that can establish wireless communication with the portable terminals is installed in each car, and that the on-board central-distribution server 1 transmits the second program listing and the advertising content data associated with the time slots to the portable terminals using the transmitter/receiver. The portable terminals can image the advertising content data according to the second program listing and display advertising contents on displays. By using the portable terminals, desired advertising materials can be seen again even when advertising video is missed, or more detailed information can be obtained. The portable terminals can be mobile phones or game consoles. When the portable terminals are used, information registered in advance about the passengers can be obtained and accordingly more reliable passenger information can be obtained, which enables more effective information provision.

While the on-board central-distribution server 1 creates the second program listing in the present embodiment, the video terminal 6 mounted on each car can create the second program listing. In this case, the video terminal 6 obtains the train information from the train information terminal 3 as well as the first program listing, the advertising content data associated with the program listing, and the passenger information from the on-board central-distribution server 1, and creates the second program listing based thereon. Similarly, the second program listing can be created by the train-information central unit 2.

While the train information terminals 3 collect the passenger information at S1 in FIGS. 10 and 11, the on-board central-distribution server 1 instead of the train information terminals 3 can collect the passenger information. In this case, the on-board central-distribution server 1 has a video-information analyzing function as the in-car monitoring server 11. The processes at S1 to S4 in FIGS. 10 and 11 (except for the collection of the train information by the train information terminals 3) can be all performed by each of the displays 7L. In this case, when at which position in which car each of the displays 7L is installed can be identified by an IP address or the like and when each of the displays 7L creates the second program listing by itself according to the installation position of the display 7L, the advertising effectiveness is further increased (that is, when a relation between identification information such as the IP address and the installation position in the car is previously defined, each display 7L can recognize the installation position in the car by referring to its own IP address or the like). Each display 7L needs to have the same function as the on-board central-distribution server 1 that performs the processes, that is, a function of storing the first program listing and the advertising content data, a function of creating the second program listing and the like. For example, when the train information (such as train running position information, line information, upbound/downbound information, and time information) of a train indicates that it is in the summer and that the train is running on a line having a swimming beach on a sea side (a side on which the sea is seen from the train windows) and a resort hotel on a mountain side (a side on which a mountain is seen from the train windows), each display 7L can create the second program listing using the program listing templates "for women" so that advertising contents for sunscreen cosmetics are displayed on the displays 7L over doors on the sea side in women-only cars and advertising contents for package tours for women are displayed on the displays 7L over doors on the mountain side in the women-only cars.

While the passenger information server 10 and the in-car monitoring server 11 are included in the ground system 50 in the present embodiment, a configuration in which the passenger information server 10 and the in-car monitoring server 11 are installed in the on-board system 51 is also possible. In this case, the on-board central-distribution server 1 can obtain the passenger information in real time from the passenger information server 10 and the in-car monitoring server 11 on the train without using the train-to-ground wireless communication using the information transmitters/receivers 5 and 13. For example, when the in-car monitoring server 11 is installed in the on-board system 51, the videos taken by the monitoring cameras installed in the cars are transmitted to the on-board system 51 through the train information terminals 3, for example. When the videos of the monitoring cameras installed on the station platforms are to be transmitted to the in-car monitoring server 11, this is achieved through the train-to-ground wireless communication using the information transmitters/receivers 5 and 13. The same holds for a case where data read by the automatic ticket checkers are transmitted to the passenger information server 10, for example. The passenger information server 10 and the in-car monitoring server 11 on the train can transmit the passenger information to the ground content-distribution server 12 through the train-to-ground wireless communication using the information transmitters/receivers 5 and 13. It is also possible to install one of the passenger information server 10 and the in-car monitoring server 11 in the ground system 50 and install the other in the on-board system 51. Furthermore, the creating process for the first program listing can be performed on the train instead of on the ground by installing a content distribution server having the same function as the ground content-distribution server 12 in the train.

While the program listing is a time table in the present embodiment as shown in the example of FIG. 8, the program listing can be set in a roll (repetition of advertising contents). FIG. 8 depicts a method (time table) of showing advertising contents of 30 seconds of six types including (1) soft drink and beer →(2) games →(3) travel agencies →(4) information related to recruitment →(5) commercials for universities →(6) commercials for railway service companies in turn for businessmen, for example, during a time period of three minutes between "08:00:01 to 08:03:00". However, another method (roll) of showing some specific advertising contents repeatedly during three minutes as (1) soft drink and beer →(2) games →(1)→(2)→(1)→(2), or (1) soft drink and beer →(2) games →(3) travel agencies →(1)→(2)→(3) is also possible. With this method, it suffices that a program listing template including only time slots corresponding to a repetition unit is prepared and there is no need to include time slots for second and subsequent repetitions. For example, in a method of repeatedly showing a unit of (1), (2), and (3) as (1)→(2)→(3)→(1)→(2)→(3), it suffices for repeated display that a program listing template including only time slots of (1), (2), and (3) is prepared and the second program listing is created according to this program listing template. Furthermore, various needs of advertising companies (needs for impressing with advertisements by repeatedly displaying the advertisements many times, for example) can be flexibly addressed.

Second Embodiment

Figure 13:
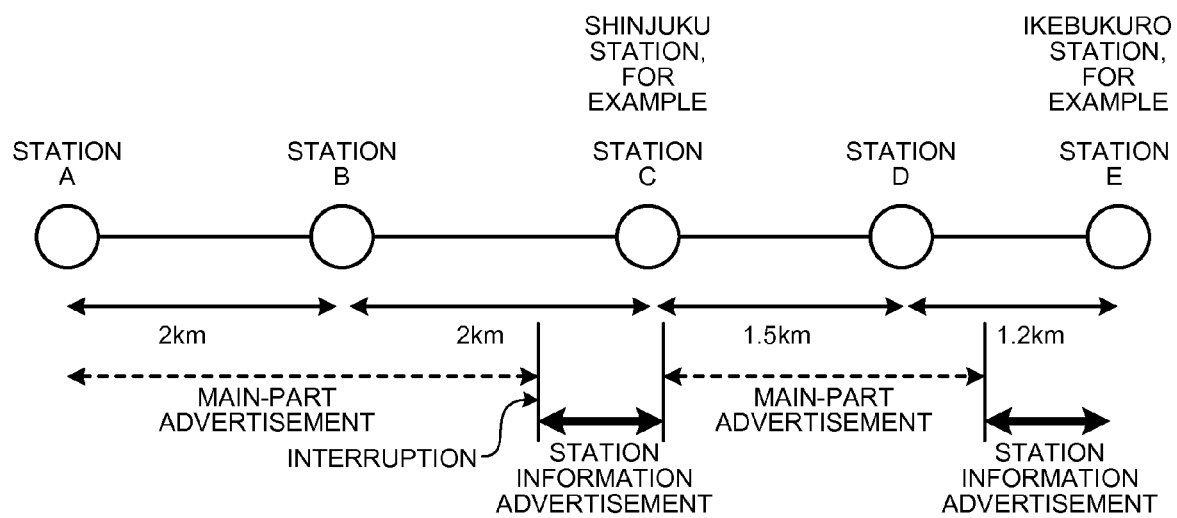
FIG. 13 depicts a video display method according to a second embodiment.

FIG. 13 depicts a video display method according to a second embodiment of the present invention. As shown in FIG. 13, there are stations A to E, for example, as stops along a line and distances between stations are as shown in FIG. 13 (a distance between the stations A and B is 2 kilometers, for example). It is assumed here that the train runs from the station A to the station E. While advertising information according to the second program listing explained in the first embodiment is normally displayed in cars of the train (hereinafter, these advertisements are referred to as "main-part advertisement"), an interruption by station information advertisements is performed when the train reaches a predetermined distance (several hundred meters, for example) short of the station C, for example, as a base station. That is, while the main-part advertisement as a base program is mainly shown on the displays 7L in the cars repeatedly according to the second program listing during traveling, display is switched from the main-part advertisement to the station information advertisements at a predetermined timing when the train approaches the base stations such as the station C and the station E as in the example shown. The station information advertisements include information related to the next stop. The interruption by the station information advertisements is performed at a timing when a program of the main-part advertisement being shown is finished to switch to the next program, thereby preventing switch of display during the program.

This switching control is performed by the on-board central-distribution server 1 or the video terminals 6. In each case, the timing of the interruption is detected by figuring out an accurate train position of a running train and calculating distances to stops based on the train information such as the stops, the running position, and the kilometrage. For example, when obtaining the train information from the train-information central unit 2 or the train information terminals 3 and recognizing that the train has reached a predetermined distance short of the next stop based on the obtained train information, the on-board central-distribution server 1 switches display materials from display of the main-part advertisement to display of the station information advertisements through the video terminals 6 considering the timing of the end of the program of the main-part advertisement, which is being shown. That is, the on-board central-distribution server 1 transmits a switch command to the video terminals 6 and the video terminals 6 switch materials to be displayed on the displays 7L according to the switch command. Here, the video terminals 6 have a program listing for station information advertisements and station information advertising content data allocated to time slots of the program listing, and these are stored in the storage devices 9 connected to the video terminals 6.

FIG. 14 is an example of the program listing for station information advertisements. As shown in FIG. 14, the program listing for station information advertisements includes three programs (Numbers 1 to 3), for example, and the station information advertisement of Number 1 is related to "Department Store A" located near Shinjuku Station. Therefore, the advertisement related to "Department Store A" is shown instead of the main-part advertisement from when the train reaches a predetermined distance short of Shinjuku Station until when the train leaves Shinjuku Station. Stations where each program of the program listing for station information advertisements is to be displayed are described in the program listing as "specified stations". Air-time periods, airtimes, designation of upbound or downbound and the like are also described. To explain this in the example of "Department Store A", the air-time period is "from Apr. 1, 2009 to Apr. 30, 2009", the airtime is limited to "morning", and it is shown in trains on "up and down lines" arriving at Shinjuku Station. The same holds for other advertisement examples shown in FIG. 14.

The display of the station information advertisements is performed until when the train leaves the station and the main-part advertisement is shown again according to the second program listing when the train leaves the station. At this time, the main-part advertisement is started from a program next to the program that has ended at the interruption.

In addition to the display of the main-part advertisement explained in the first embodiment, according to the present embodiment, the display of the station information advertisements of a station at which the train will arrive can be performed in the cars when the train approaches the station, which enables provision of regional information near the station and the like. Configurations, operations, and effects other than those explained above are identical to those in the first embodiment.

Third Embodiment

FIG. 15 is a schematic diagram of a video display method according to a third embodiment of the present invention. FIG. 15 depicts the on-board system 51 explained in the first embodiment and a network client 45 installed at a base station, for example, and also depicts an opening operation for the doors 20L and 20R in a car involved with arrival of the train at the base station and the like. The ground system 50 shown in FIG. 1 is omitted in FIG. 15. The ground system 50 and the on-board system 51 have the same configurations as those in the first embodiment.

As shown in FIG. 15, the network client 45 installed at the base station includes an information transmitter/receiver 40 that transmits or receives information to or from the on-board system 51 using millimeter waves, for example, a content relay board 41 that is connected to the information transmitter/receiver 40 to relay distribution of station information advertising content data and the like, an in-station CM controller 42 that performs display control of station information advertisements in a station yard (referred to as "in-station"), and a display 43 that is installed in the station yard to display the station information advertisements under control of the in-station CM controller 42.

Figure 16:
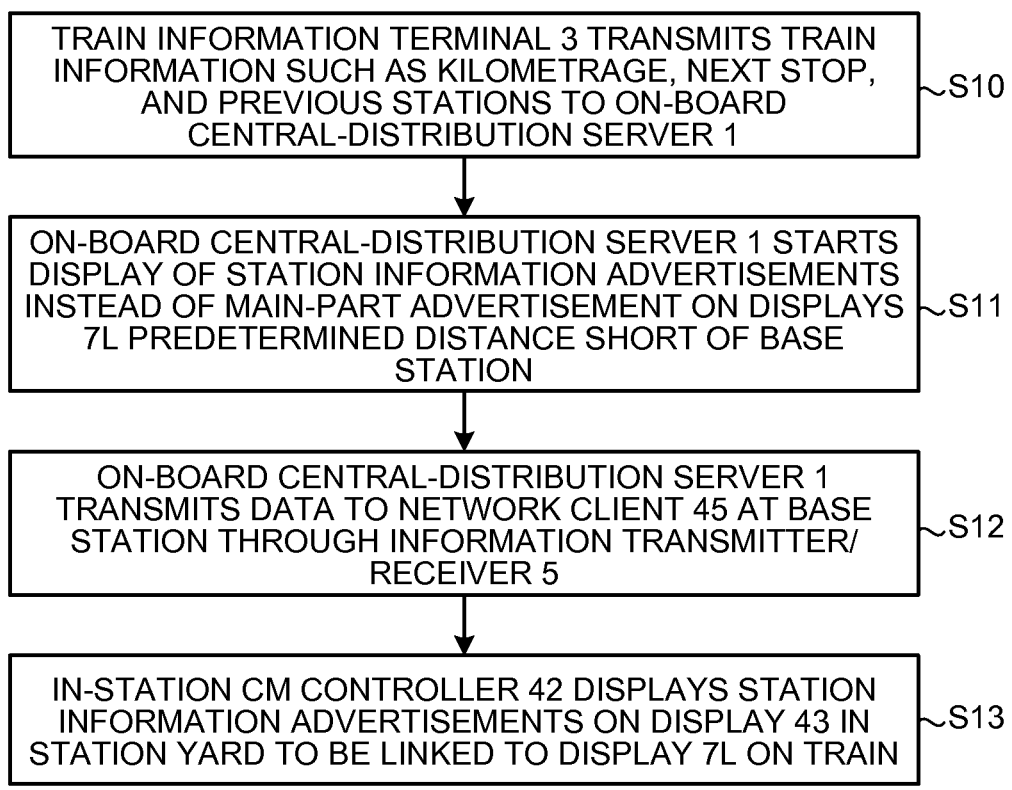
FIG. 16 is a flowchart of the video display method according to the third embodiment.

An operation of the present embodiment is explained with reference to FIGS. 15 and 16. FIG. 16 is a flowchart of the video display method according to the present embodiment.

The train information terminals 3 transmit the train information such as kilometrage, the next stop, and previous stations to the on-board central-distribution server 1 (S10 in FIG. 16).

The on-board central-distribution server 1 then starts display of the station information advertisements instead of the main-part advertisement on the displays 7L the predetermined distance short of the base station (specified station) (S11). The on-board central-distribution server 1 continues the display of the station information advertisements until the train leaves the base station.

The on-board central-distribution server 1 then transmits data to the network client 45 at the base station through the information transmitter/receiver 5 (S12). The data to be transmitted are station information advertising content data related to the base station.

The in-station CM controller 42 then displays the station information advertisements on the display 43 in the station yard to be linked with the displays 7L on the train using the station information advertising content data distributed from the train, which are received from the information transmitter/receiver 40 and transferred through the content relay board 41 (S13). That is, immediately after the doors 20L and 20R are opened when the train arrives at the base station (FIG. 15), the display 43 in the station yard is caused to display the same station information advertisements as those having been displayed in the train. For example, when advertisements related to bargain sale information at Department Store A are shown on the displays 7L in the train before arrival, the display 43 in the station yard displays the bargain sale information at Department Store A and also displays station information advertisements including guidance to the nearest station exit to Department Store A, for example. It is effective to install the display 43 near the doors 20L and 20R of the train that stops at the station or near a ticket gate, for example.

While the in-station CM controller 42 starts the display of the station information advertisements on the display 43 immediately after the doors 20L and 20R are opened when the train arrives at the base station, the in-station CM controller 42 can determine the start timing as follows. When the train enters a platform, ground-to-train wireless communication using the millimeter waves, for example, is first started between the information transmitter/receiver 5 of the train and the information transmitter/receiver 40 on the ground. The train information managed by the train-information central unit 2 or the train information terminals 3 is transmitted to the in-station CM controller 42 in real time through the ground-to-train wireless communication. Particularly when the train stops at the platform and the doors 20L and 20R are opened, "station arrival information" held by the train-information central unit 2 or the train information terminals 3 is transmitted to the in-station CM controller 42 in real time. In this case, the "station arrival information" is a kind of train information. The in-station CM controller 42 starts the display of the station information advertisements on the display 43 immediately after reception of the "station arrival information", so that the display can be started almost at the same time the doors 20L and 20R are opened (in real time). Of course, it is necessary at this time that station information advertising content data to the used for the display are prepared in advance in the in-station CM controller 42 and that the in-station CM controller 42 stands by in a state to wait for a timing command (that is, reception of the "station arrival information").

While the train-to-ground wireless communication uses here the millimeter waves, for example, the present invention is not limited thereto. For example, a packet communication network (DoPa®, for example) for mobile terminals or a wireless communication network (wireless LAN) such as WIMAX can be also used in the train-to-ground wireless communication. Even when any wireless communication method is utilized in the train-to-ground wireless communication, the train information held in the train-information central unit 2 or the train information terminals 3 can be wirelessly transferred to the in-station CM controller 42 in real time when the train enters any wireless communication area.

According to the present embodiment, the station information advertisements that have been displayed in the train before arrival at the station can be displayed in a linked manner also in the yard of a station where the train has stopped. Therefore, the station information advertisements can appeal more effectively to passengers who exit the train at the stop. Configurations, operations, and effects other than those explained above are identical to those in the first and second embodiments.

INDUSTRIAL APPLICABILITY

As described above, the in-train information distribution and display system and the in-train information distribution and display method according to the present invention are suitable for automatically selecting advertising information having higher advertising effectiveness and displaying the selected advertising information on displays in a train.

REFERENCE SIGNS LIST 1 on-board central-distribution server
2 train-information central unit
3 train information terminal
4 transfer unit
5, 13 information transmitter/receiver
6 video terminal
7L, 7R, 14, 43 display
9 storage device
10 passenger information server
11 in-car monitoring server
12 ground content-distribution server
15 IC card
20L, 20R door
22 automatic ticket checker
23 train window
40 information transmitter/receiver
41 content relay board
42 in-station CM controller
45 network client
50 ground system
51 on-board system

The invention claimed is:

1. An in-train information distribution and display system that enables to display a plurality of pieces of advertising information on displays in a train according to a program listing, the system comprising:
   a ground content-distribution server that associates a plurality of advertising content data as candidates of program materials with time slots that are set in a first program listing, attaches auxiliary information that is to be attached to each of the advertising content data and that can be compared with train information collected on the train as an attribute tag group to each of the advertising content data, and then transmits the first program listing and the advertising content data associated with the time slots of the first program listing to the train;
   an on-board central-distribution server that receives the first program listing and the advertising content data associated with the time slots of the first program listing from the ground content-distribution server, obtains the train information from the ground content-distribution server, compares the attribute tag group with the train information with respect to each of the advertising content data associated with the time slots, determines one of the plural advertising content data to be allocated to each of the time slots based on a corresponding comparison result, thereby creating a second program listing from the first program listing, and distributes the second program listing and the advertising content data allocated to time slots of the second program listing to each car;

a video terminal that displays the advertising content data allocated to each of the time slots on the displays according to the second program listing and has a station information advertising program listing for displaying a station information advertisement as an advertisement including information related to a specified station along a line of the train and station information advertising content data allocated to time slots of the program listing;

a station-yard display that is installed in a station yard of the specified station; and a controller that performs display control of the station-yard display provided at the specified station, wherein the on-board central distribution server switches display of advertising contents according to the second program listing through the video terminal to display the station information advertisement related to the specified station according to the station information advertising program listing from when it is determined, based on running position information being one piece of the train information, that the train reaches a predetermined distance short of the specified station until when the train leaves the specified station, and after the train arrives at the specified station, the controller causes the station-yard display to display advertising information including materials of the station information advertisement that has been shown in the train from when the train has reached the predetermined distance short of the specified station until when the train arrives at the specified station.

2. The in-train information distribution and display system according to claim 1, wherein the ground content-distribution server determines the first program listing and the advertising content data associated with the first program listing based on passenger information related to passengers who use the train.

3. The in-train information distribution and display system according to claim 2, comprising:

a passenger information server that manages passenger information obtained through ticket checking at automatic ticket checkers at stations, wherein the passenger information server transmits the passenger information to the ground content-distribution server.

4. The in-train information distribution and display system according to claim 2, comprising:

an in-car monitoring server that extracts passenger information from videos taken by monitoring cameras installed in the train and manages the passenger information, wherein the in-car monitoring server transmits the passenger information to the ground content-distribution server.

5. The in-train information distribution and display system according to claim 2, wherein the ground content-distribution server has program listing templates each corresponding to an attribute of the passengers including age, sex, and occupation of the passengers, and the ground content-distribution server selects a program listing template of an attribute that matches the passenger information from among the program listing templates each corresponding to an attribute of the passengers based on the passenger information and sets the selected program listing template as the first program listing.

6. The in-train information distribution and display system according to claim 2, wherein the attribute tag group contains attribute tags that can be compared with the passenger information, and the on-board central-distribution server obtains the train information and the passenger information, compares the attribute tag group with the train information and the passenger information with respect to each of the advertising content data associated with the time slots of the first program listing, and determines one of the advertising content data associated with the time slots based on a corresponding comparison result to be allocated to each of the time slots, thereby creating a second program listing from the first program listing.

7. An in-train information distribution and display method that enables to display a plurality of pieces of advertising information on displays in a train according to a program listing, the method comprising:

a step of associating a plurality of advertising content data as candidates of program materials with time slots that are set in a first program listing and attaching auxiliary information that is to be attached to each of the advertising content data and that can be compared with train information collected on the train as an attribute tag group to each of the advertising content data, performed in a ground content-distribution server;

a step of transmitting the first program listing and the advertising content data associated with the time slots of the first program listing from the ground content-distribution server to an on-board central-distribution server;

a step of receiving the first program listing and the advertising content data associated with the time slots of the first program listing that are transmitted from the ground content-distribution server and obtaining the train information, performed in the on-board central-distribution server;

a step of comparing the attribute tag group with the train information with respect to each of the advertising content data associated with the time slots of the first program listing and determining one of the plural advertising content data to be allocated to each of the time slots based on a corresponding comparison result, thereby creating a second program listing from the first program listing, performed in the on-board central-distribution server;

a step of distributing the second program listing and the advertising content data allocated to time slots of the second program listing to a video terminal mounted on each car, performed in the on-board central-distribution server;

a step of causing the displays to display the advertising content data allocated to each of the time slots according to the second program listing, performed in the video terminal;

a step of providing the displays with a station information advertising program listing for displaying a station information advertisement as an advertisement including information related to a specified station along a line of the train and station information advertising content allocated to time slots of the program listing;

a step of switching display of advertising contents according to the second program listing through the displays to display the station information advertisement related to the specified station according to the station information advertising program listing from when it is determined, based on running position information being one piece of the train information, that the train reaches a predetermined distance short of the specified station until when the train leaves the specified station; and a step of causing a station-yard display, that is installed in a station yard of the specified station, to display, after the train arrives at the specified station, advertising information including materials of the station information advertisement that has been shown in the train from when the train has reached the predetermined distance short of the specified station until when the train arrives at the specified station.

* * * * *